US008942847B2

(12) United States Patent
Ohno et al.

(10) Patent No.: US 8,942,847 B2
(45) Date of Patent: Jan. 27, 2015

(54) MOBILE APPARATUS AND ROBOT, AND CONTROL SYSTEM THEREOF

(75) Inventors: Nobuyuki Ohno, Saitama (JP); Makoto Sekiya, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 547 days.

(21) Appl. No.: 13/313,318

(22) Filed: Dec. 7, 2011

(65) Prior Publication Data

US 2012/0150350 A1    Jun. 14, 2012

(30) Foreign Application Priority Data

Dec. 14, 2010 (JP) ................................. 2010-278470

(51) Int. Cl.
B25J 9/16 (2006.01)
(52) U.S. Cl.
CPC ..... B25J 9/1666 (2013.01); G05B 2219/35148 (2013.01); G05B 2219/40428 (2013.01); G05B 2219/40475 (2013.01)
USPC ........... 700/250; 700/245; 700/251; 700/252; 700/253; 700/255
(58) Field of Classification Search
CPC .. G05B 19/4061; B25J 9/1656; B25J 9/1664; B25J 9/1666; B25J 9/1676
USPC .................. 700/245, 250, 251, 252, 253, 255
See application file for complete search history.

(56) References Cited

U.S. PATENT DOCUMENTS 7,447,593 B2 * 11/2008 Estkowski et al. ............ 701/301
(Continued)

FOREIGN PATENT DOCUMENTS

JP    07-234993    9/1995
JP    2000-076581    3/2000
(Continued)

OTHER PUBLICATIONS

Prado, Optimal velocity planning of wheeled mobile robots on specific paths in static and dynamic environments, 2007, Mobile Robots.*

(Continued)

Primary Examiner — Thomas G Black
Assistant Examiner — Sara J Nelson
(74) Attorney, Agent, or Firm — Rankin, Hill & Clark LLP

(57) ABSTRACT

Provided is a system and the like capable of appropriately searching a desired trajectory for a controlled subject in a time-space coordinate system in view of a state of the controlled subject. An initial positional relationship (k=1) between a first reference point $q_1(k)$ and a second reference point $q_2(k)$ in the time-space coordinate system is set to satisfy a first condition defined according to a motion performance of an actuator 2. When a previous trajectory candidate tr(k−1) is determined to have a contact with an object trajectory tro, a current positional relationship (k>1) between the first reference point $q_1(k)$ and the second reference point $q_2(k)$ in the time-space coordinate system is set to satisfy a second condition that a current time interval between the first reference point $q_1(k)$ and the second reference point $q_2(k)$ is longer than a previous time interval or the like.

11 Claims, 10 Drawing Sheets

(56) References Cited

U.S. PATENT DOCUMENTS

| | | | |
|---|---|---|---|
| 7,873,438 B2* | 1/2011 | Sekiya | 700/255 |
| 8,055,383 B2* | 11/2011 | Yoshizawa | 700/255 |
| 8,103,383 B2* | 1/2012 | Nakamura | 700/255 |
| 8,666,548 B2* | 3/2014 | Lim | 700/250 |
| 2005/0216181 A1* | 9/2005 | Estkowski et al. | 701/200 |
| 2008/0234864 A1* | 9/2008 | Sugiura et al. | 700/255 |
| 2008/0249662 A1* | 10/2008 | Nakamura | 700/253 |
| 2008/0312771 A1* | 12/2008 | Sugiura | 700/259 |
| 2011/0035051 A1* | 2/2011 | Kim et al. | 700/246 |

FOREIGN PATENT DOCUMENTS

| | | |
|---|---|---|
| JP | 2010-055498 | 3/2010 |
| JP | 2010-079852 | 4/2010 |

OTHER PUBLICATIONS

Tsai et al., Motion planning of a dual-arm mobile robot in the configuration-time space, 2009, IEEE.*

Kuffner et al., RRT-Connect: An efficient approach to single-query path planning, 2000, IEEE.*

Vatcha et al., Perceived CT-space for motion planning in unknown and unpredictable environments, 2009, Springer.*

Prado ("Optimal velocity planning of wheeled mobile robots on specific paths in static and dynamic environments," 2007, Mobile Robots).*

Tsai et al. ("Motion planning of a dual-arm mobile robot in the configuration-time space," 2009, IEEE).*

Kuffner et al. ("RRT-Connect: An efficient approach to single-query path planning," 2000, IEEE).*

Japanese Office Action dated May 7, 2013, 3 pages.

* cited by examiner

MOBILE APPARATUS AND ROBOT, AND CONTROL SYSTEM THEREOF

BACKGROUND OF THE INVENTION

1. Field of the Invention

The present invention relates to an apparatus having a mobile function and the like, and a control system thereof.

2. Description of the Related Art

There has been disclosed in Japanese Patent Laid-open No. 2010-079852 a technical approach for making a mobile apparatus such as a bipedal robot or the like to move appropriately from the viewpoint of effectively preventing the movement of the mobile apparatus from being hindered by an object such as a pedestrian or the like present in the periphery of the mobile apparatus.

However, when a time-series displacement behavior of the mobile apparatus and the object in the real space, respectively, is represented by a trajectory in a time-space coordinate system, it is possible that the trajectory of the mobile apparatus may be inappropriate such as forcing the mobile apparatus to perform unreasonable behaviors.

SUMMARY OF THE INVENTION

The present invention has been accomplished in view of the aforementioned problems, and it is therefore an object of the present invention to provide a system and the like capable of searching appropriately a desired trajectory for a controlled subject in a time-space coordinate system in view of a state of the controlled subject.

To attain an object described above, the present invention provides a control system configured to control motions of an actuator so as to make time-series positions of a controlled subject in real space follow a desired trajectory in a time-space coordinate system defined by a real-space coordinate system and a time coordinate system. The control system of the present invention comprises: a first arithmetic processing element configured to set an initial positional relationship between a first reference point and a second reference point in the time-space coordinate system to satisfy a first condition defined according to a motion performance of the actuator, perform an extending process to extend a first line segment from the first reference point and extend a second line segment from the second reference point on the basis of a sequence of points in the time-space coordinate system, and perform a joining process to join the first line segment and the second line segment to search the line segment as a trajectory candidate, and a second arithmetic processing element configured to determine whether the trajectory candidate has a contact with an object trajectory representing time-series positions of an object discrete from the controlled subject in the time-space coordinate system, the first arithmetic processing element is configured to set a current positional relationship between the first reference point and the second reference point to satisfy a second condition, on a condition that a previous trajectory candidate is determined to have a contact with the object trajectory by the second arithmetic processing element, the second condition including that a current space interval between the first reference point and the second reference point in the time-space coordinate system is shorter than a previous space interval, or a current time interval between the first reference point and the second reference point in the time-space coordinate system is longer than a previous time interval, or the current space interval between the first reference point and the second reference point in the time-space coordinate system is shorter than the previous space interval and the current time interval between the first reference point and the second reference point in the timespace coordinate system is longer than the previous time interval, and search a current trajectory candidate, and the first arithmetic processing element is configured to set the previous trajectory candidate as the desired trajectory, on a condition that the previous trajectory candidate is determined to have no contact with the object trajectory by the second arithmetic processing element.

To attain an object described above, the present invention provides a mobile apparatus comprising an actuator and the control system, wherein the mobile apparatus serves as a controlled subject to the control system, the control system is configured to control motions of the actuator so as to make the mobile apparatus follow a desired trajectory in real space.

To attain an object described above, the present invention provides a robot comprising a base body, a limb extended from the base body, an actuator and a control system, wherein the limb serves as a controlled subject to the control system, and the control system is configured to control motions of the actuator so as to displace the limb to make the robot follow a desired trajectory in real space.

According to the control system, the mobile apparatus or the robot (hereinafter, arbitrarily referred to as the control system and the like) of the present invention, a trajectory candidate having no contact with the object trajectory in the time-space coordinate system is generated as the desired trajectory. By controlling the movement of the actuator along the desired trajectory, it is possible to displace the controlled subject in real space while preventing the situation where controlled subject contacts the object.

The relative positional relationship between the first reference point and the second reference point of the trajectory candidate in the time-space coordinate system determines a velocity of the controlled subject when moving from a first spatial position (the real space component of the first reference point) to a second spatial position (the real space component of the second reference point). Specifically, the longer the time interval between the first reference point (an anterior point in the time sequence) and the second reference point (a posterior point in the time sequence) in the time-space coordinate system is, in other words, the longer the time required by the controlled subject to displace from the first spatial position to the second spatial position in the real space is, the lower the velocity of the controlled subject will be. The shorter the space interval between the first reference point and the second reference point in the time-space coordinate system is, in other words, the shorter the real space distance for the controlled subject to move from the first spatial position to the second spatial position is, the lower the velocity of the controlled subject will be.

Therefore, the initial positional relationship between the first reference point and the second reference point in the time-space coordinate system is set so as to satisfy the first condition, and the first condition is defined according to the motion performance of the actuator.

According thereto, a desired velocity for displacing the controlled subject from the first spatial position to the second spatial position in the real space can be prevented from becoming an inappropriate value deviated out of an allowable range of displacement velocity of the controlled subject which is defined according to the motion performance of the actuator.

The previous trajectory candidate is determined to have a contact with the object trajectory, the current positional relationship between the first reference point and the second reference point in the time-space coordinate system is set to satisfy the second condition. The second condition means that the current space interval between the first reference point and the second reference point in the time-space coordinate system is shorter than the previous space interval, or the current time interval between the first reference point and the second reference point in the time-space coordinate system is longer than a previous time interval, or the current space interval between the first reference point and the second reference point in the time-space coordinate system is shorter than the previous space interval and the current time interval between the first reference point and the second reference point in the time-space coordinate system is longer than the previous time interval.

According thereto, each time when the researching of a trajectory candidate is repeated, the trajectory candidate is searched in which the velocity for displacing the controlled subject from the first spatial position to the second spatial position in the real space being gradually reduced. Thereby, the desired velocity of the controlled subject can be prevented from being given an inappropriate value beyond the upper limit of the allowable range of displacement velocity of the controlled subject which is defined according to the motion performance of the actuator.

Thereby, the desired trajectory for the controlled subject in the time-space coordinate system can be searched appropriately in view of the state of the controlled subject such as the motion performance of the actuator or the like.

It should be noted that a constituent element of the present invention "recognizes" information means that the constituent element performs a possible information processing on a piece of information to prepare the piece of information ready for other information processing, for example, the constituent element searches the piece of information in a database or memory or retrieves the piece of information from a storing device such as a memory; measures, calculates, estimates or determines the piece of information on the basis of output signals of a sensor or the like; and stores in memory the calculated information or the like.

It is acceptable that the first arithmetic processing element is configured to eliminate a point positioned in the past of the time sequence with respect to a preceding point from the sequence of points proceeding to the first reference point which is used in searching the trajectory candidate and a point positioned in the future of the time sequence with respect to the preceding point from the sequence of points proceeding to the second reference point which is used in searching the trajectory candidate.

According to the control system having the mentioned configuration, an irrealizable trajectory candidate tracking back to the past of the time sequence in the time-space coordinate system can be prevented from being searched.

It is acceptable that the first arithmetic processing element is configured to eliminate a point beyond an allowable range defined in accordance with the motion performance of the actuator with respect to the preceding point from the sequence of points which is used in searching the trajectory candidate.

According to the control system having the mentioned configuration, it is possible to prevent the controlled subject from being forced to displace at a velocity beyond the allowable range defined according to the motion performance of the actuator.

It is acceptable that the first arithmetic processing element is configured to define a plurality of second reference points with respect to a singular first reference point or a plurality of first reference points with respect to a singular second reference point in the time-space coordinate system, and search a line segment joining the singular first reference point to a singular second reference point among the plurality of the second reference points or a line segment joining a singular first reference point among the plurality of the first reference points and the singular second reference point which is obtained fastest by performing the extending process and the joining process, as the trajectory candidate.

According to the control system having the mentioned configuration, a motion instruction signal can be transmitted to the actuator as soon as possible according to the searching result of the desired trajectory. Therefore, when the displacement behavior of the controlled is controlled at real time in parallel to the searching of the desired trajectory, it is possible to prevent the controlled subject from becoming temporally frozen or completely stopped in operation.

It is acceptable that the first arithmetic processing element is configured to define a plurality of second reference points with respect to a singular first reference point or a plurality of first reference points with respect to a singular second reference point in the time-space coordinate system, select a singular line segment from a plurality of line segments obtained by joining the singular first reference point to the plurality of the second reference points respectively or a line segment from a plurality of line segments obtained by joining the plurality of the first reference points and the singular second reference point, by performing the extending process and the joining process, in accordance with the time interval between the first reference point and the second reference point, and search the selected line segment as the trajectory candidate.

According to the control system having the mentioned configuration, the length of time required by the controlled subject to displace from the first spatial position to the second spatial position along the desired trajectory can be adjusted. For example, by setting a trajectory candidate in which the required time is the shortest, it is possible to displace the controlled subject as soon as possible.

It is acceptable that the first arithmetic processing element is configured to set the initial positional relationship between the first reference point and the second reference point through adjusting the length of at least one of the initial time interval and the initial space interval between the first reference point and the second reference point in the time-space coordinate system according to a level of a contact probability between the controlled subject and the object.

It is acceptable that the first arithmetic processing element is configured to set the current positional relationship between the first reference point and the second reference point by adjusting the length of at least one of the current time interval and the current space interval between the first reference point and the second reference point in the time-space coordinate system, taking at least one of the previous time interval and the previous space interval as a reference, according to a level of contact probability between the controlled subject and the object, on a condition that a previous trajectory candidate is determined to have a contact with the object trajectory by the second arithmetic processing element.

According to the control system having the mentioned configuration, the positional relationship between the first reference point and the second reference point in the time-space coordinate system may be set or corrected appropriately so that a trajectory candidate decreasing a contact probability between the controlled subject and the object may be searched appropriately.

It is acceptable that the first arithmetic processing element is configured to perform an interpolation process to generate line segments represented by a linear combination of the sequence of points, in which a basis function for space interpolation serves as a combination coefficient, according to the mutually discrete points lined up in the time-space coordinate system, add new points to the sequence of points which is the base of one line segment generated by the interpolation process to define a new sequence of points and perform the interpolation process with the new sequence of points as the base so as to perform the extending process to generate a new line segment in which the one line segment is extended by an extended line segment, and perform the interpolation process on the new sequence of points which is the base of the one line segment recently extended according to the extending process and another sequence of points which is the base of another line segment generated by the interpolation process so as to perform the joining process which generates a line segment with a form of the one line segment and the another line segment being joined by a joining line segment.

According to the control system having the mentioned configuration, the desired trajectory or a trajectory candidate thereof is generated by performing an interpolation process to generate line segments represented by a linear combination of the sequence of points in the time-space coordinate system, and the linear combination of the sequence of points has a basis function for space interpolation serving as a combination coefficient. Therefore, it is not a polygonal line passing through each of the plural points lined up in the time-space coordinate system but a continuous or smooth line segment joining the first reference point and the second reference point which is represented by the linear combination of the plural points (control point) is generated as the desired trajectory or a trajectory candidate thereof for the controlled subject. Thereby, continuousness or smoothness of the displacement behavior of the controlled subject along the desired trajectory may be maintained.

It is acceptable that the second arithmetic processing element is configured to perform a first determination process which determines whether or not a specified condition including that the extended line segment deviates from the object trajectory in the time-space coordinate system is satisfied, and the first arithmetic processing element is configured to discard the one line segment and perform the extending process on condition that the determination result of the first determination process is negative.

It is acceptable that the second arithmetic processing element is configured to perform a second determination process which determines whether or not a specified condition including that the joining line segment deviates from the object trajectory in the time-space coordinate system is satisfied, and the first arithmetic processing element is configured to redefine a new sequence of points and perform the extending process on condition that the determination result of the second determination process is negative.

According to the control system having the mentioned configuration, continuousness or smoothness of the displacement of the controlled subject along the desired trajectory may be maintained while preventing the controlled subject from having a contact with the object.

DETAILED DESCRIPTION OF THE PREFERRED EMBODIMENTS

Configuration of a Mobile Apparatus

Robot

Figure 1:
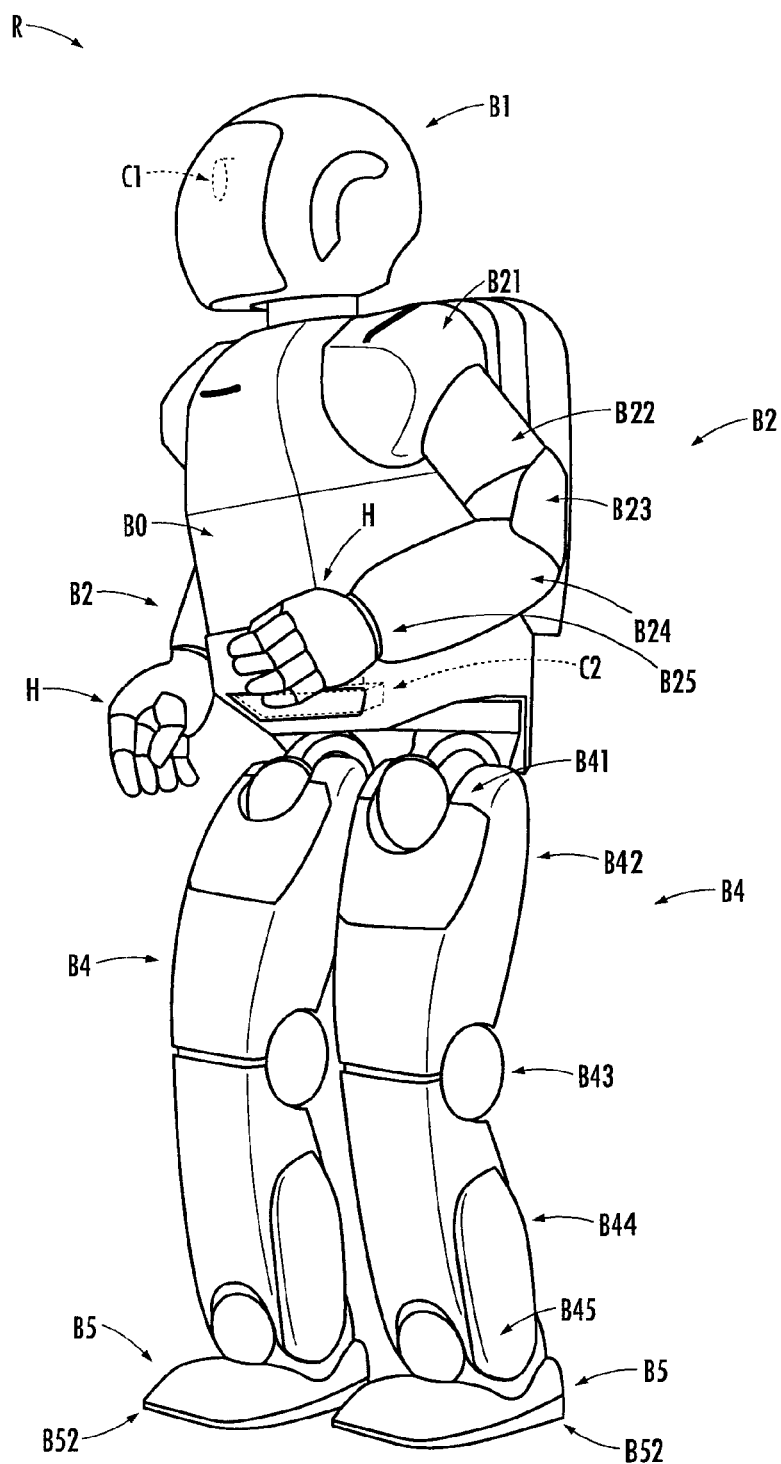
FIG. 1 is a diagram illustrating a configuration of a robot according to an embodiment of the present invention.

The robot R illustrated in FIG. 1 is a legged mobile robot. Similar to a human being, the robot R has a main body B0, a head B1 disposed at the upper end of the main body B0, right and left arms B2 which are provided at an upper portion of the main body B0 by extending from both sides thereof, respectively, right and left hands H provided at the respective end portion of the right and left arms B2, right and left legs B4 which are provided respectively at a lower portion of the main body B0 by extending downward therefrom.

The main body B0 is composed of an upper portion and a lower portion which are joined vertically in such a way that the two portions can rotate relatively around the yaw axis. The head B1 can move, such as rotate around the yaw axis with respect to the main body B0.

The arm B2 is provided with a first arm link B22 and a second arm link B24. The main body B0 and the first arm link B22 are joined through a shoulder joint mechanism (first arm joint mechanism) B21. The first arm link B22 and the second arm link B24 are joined through an elbow joint mechanism (second arm joint mechanism) B23. The second arm link B24 and the hand H are joined through a wrist joint mechanism (third arm joint mechanism) B25. The shoulder joint mechanism B21 has degrees of rotation freedom around the roll axis, the pitch axis and the yaw axis. The elbow joint mechanism B23 has a degree of rotation freedom around the pitch axis. The wrist joint mechanism B25 has degrees of rotation freedom around the roll axis, the pitch axis and the yaw axis.

The leg B4 is provided with a first leg link B42, a second leg link B44 and a foot B5. The main body B0 and the first leg link B42 are joined through a hip joint mechanism (first leg joint mechanism) B41. The first leg link B42 and the second leg link B44 are joined through a knee joint mechanism (second leg joint mechanism) B43. The second leg link B44 and the foot B5 are joined through an ankle joint (third leg joint mechanism) B45.

The hip joint mechanism B41 has degrees of rotation freedom around the roll axis, the pitch axis and the roll axis. The knee joint mechanism B43 has degrees of rotation freedom around the pitch axis. The ankle joint mechanism B45 has degrees of rotation freedom around the roll axis and the pitch axis. The hip joint mechanism B41, the knee joint mechanism B43 and the ankle joint mechanism B45 constitute a "leg joint mechanism group". The translation and the degree of rotation freedom for each joint mechanism included in the leg joint mechanism group may be changed where appropriate. It is acceptable to omit any one joint mechanism in the hip joint mechanism B41, the knee joint mechanism B43 and the ankle joint mechanism B45 and constitute the leg joint mechanism group with a combination of the remained two joint mechanisms. Moreover, when the leg B4 is provided with a second leg joint mechanism different from the knee joint, the leg joint mechanism group may be constituted by including the second leg joint mechanism. In order to relieve impact when stepping on floor, the bottom of the foot B5 is disposed with an elastic element B52 as disclosed in Japan Patent Laid-Open No. 2001-129774.

The robot R is mounted with a plurality of internal state sensors $S_1$ for measuring an internal state such as a position, a posture and the like of the robot R in global coordinate system. An encoder (not shown) which outputs signals in accordance with a flexion angle (joint angle) of each joint mechanism of the robot R, an inclination sensor which outputs signals in accordance with the posture (specified according to an azimuth angle and an elevation angle) of the body B0, a pressure sensor which determines the foot B5 and whether the foot is landing on floor and elevated from floor, respectively, and the like correspond to the internal state sensors $S_1$. In addition, an imaging device which images the surroundings of the robot R and recognizes a position of the robot R in the global coordinate system by recognizing a position of a mark fixed in the global coordinate system on the basis of the imaging coordinate also corresponds to the internal state sensors $S_1$.

For example, a pair of head cameras C1 mounted laterally in the head B1, such as CCD cameras, infrared cameras and the like, which can sense lights of various wave bands and photograph the front side of the robot R as an imaging range of the head cameras C1, may be adopted as the imaging device. Moreover, a waist camera (active sensor) C2 mounted in a lower front portion of the body B0 for determining a position, direction and the like of an object by emitting near infrared rays toward the object in a lower front region of the robot R and detecting reflection rays reflected from the object may be adopted as the imaging device.

The robot R is mounted with an external state sensor $S_2$ for determining an external state such as a position or the like of an object in the surroundings of the robot R. The imaging device mentioned above corresponds to the external state sensor $S_2$.

The robot R is provided with a computer which compose a part of the control system 1 and a plurality of actuators 2 for driving each of the plurality of the aforementioned joint mechanisms. By controlling each of the actuators 2 according to control commands output from the control system 1 on the basis of the internal state and the external state of the robot R, the robot R can be controlled to act adaptively in various behaviors.

In addition to the robot R (refer to FIG. 1), any apparatus, such as a vehicle or the like, the motions of which are controlled to displace according to the desired trajectory partially or entirely may be adopted as the controlled subject.

Configuration of the Control System

Figure 2:
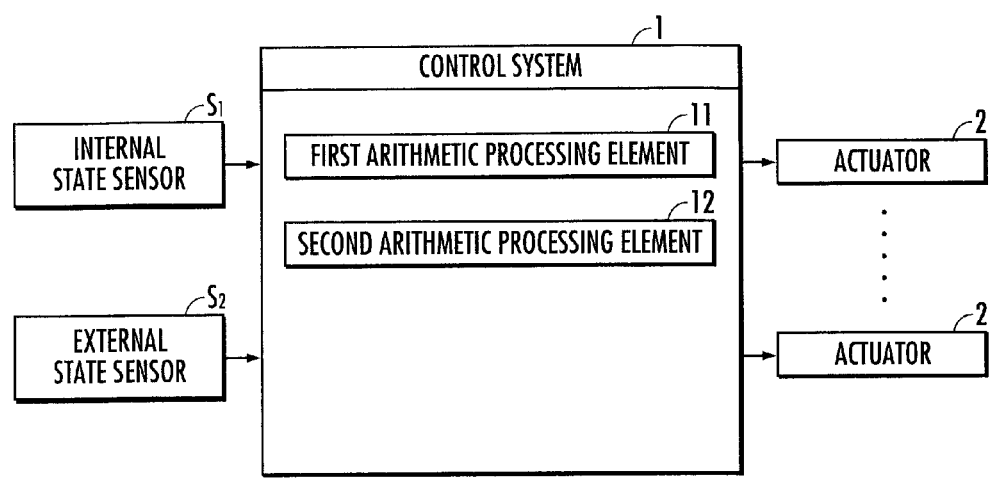
FIG. 2 is a block diagram illustrating a control system according to an embodiment of the present invention.

The control system 1 illustrated in FIG. 2 is composed of a computer mounted in the robot R. The control system 1 is provided with a first arithmetic processing element 11 and a second arithmetic processing element 12 to perform arithmetic processes to be described hereinafter.

Each of the first arithmetic processing element 11 and the second arithmetic processing element 12 is provided with a processor and a memory as the hardware resources. The first arithmetic processing element 11 and the second arithmetic processing element 12 may be constructed from common hardware resources or from hardware resources different at least partially.

"An arithmetic processing element is configured to perform an arithmetic process" means that the processor constituting the arithmetic processing element is programmed to retrieve necessary software from the memory and execute the software so as to perform the arithmetic process.

Functions of the Robot

Herein, the description is given on such a case where the motions of the actuator 2 are controlled to perform a task in which the robot R moves the right and left legs B4 to walk through moving humans (objects) to a destination.

Figure 3:
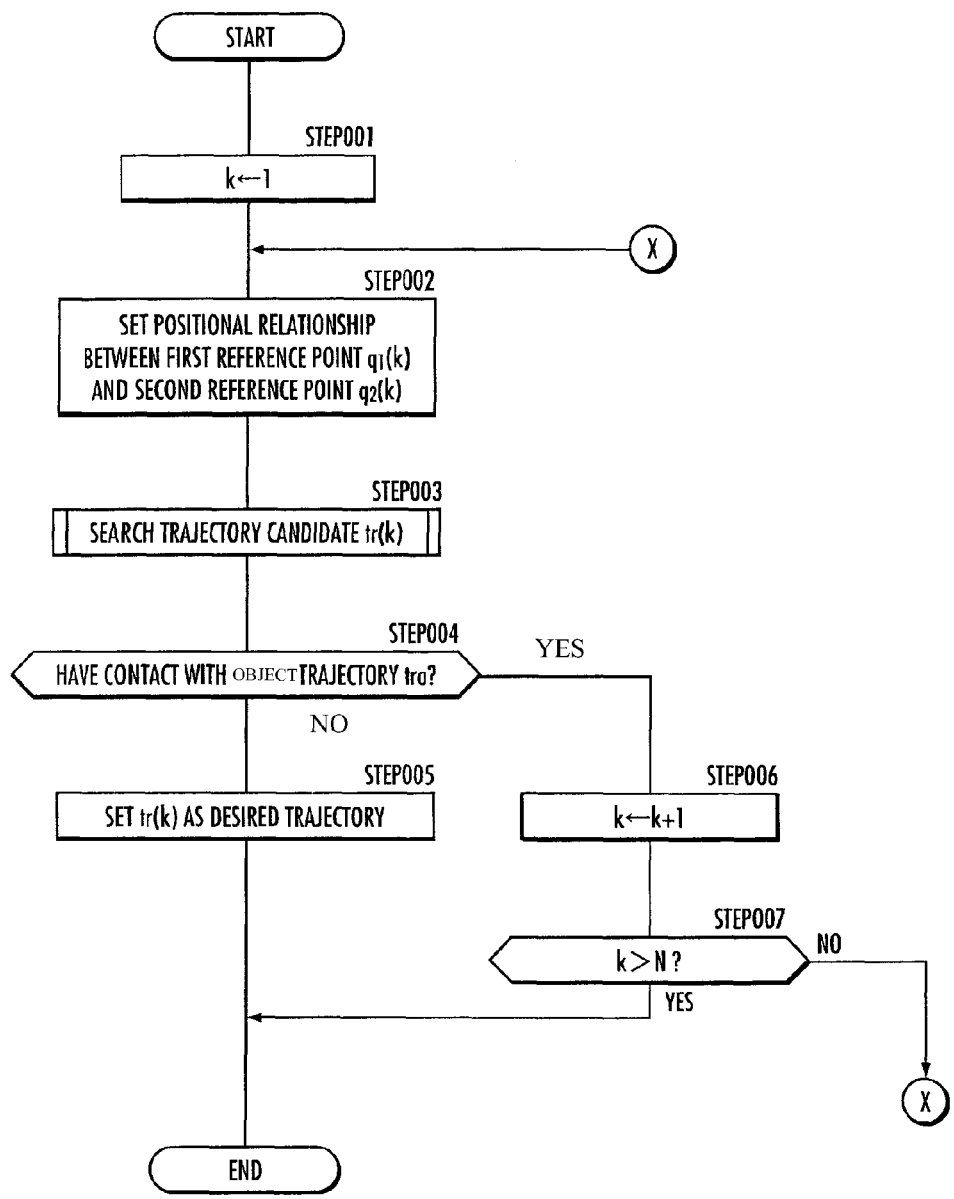
FIG. 3 is a flow chart illustrating an arithmetic process performed by the control system.

First, an index k denoting the number of repetition times of a searching process for a trajectory candidate is reset to "1", which is triggered by such a phenomenon that the control system 1 is switched from the power-off state to the power-on state or the like (FIG. 3/STEP 001).

Figure 4:
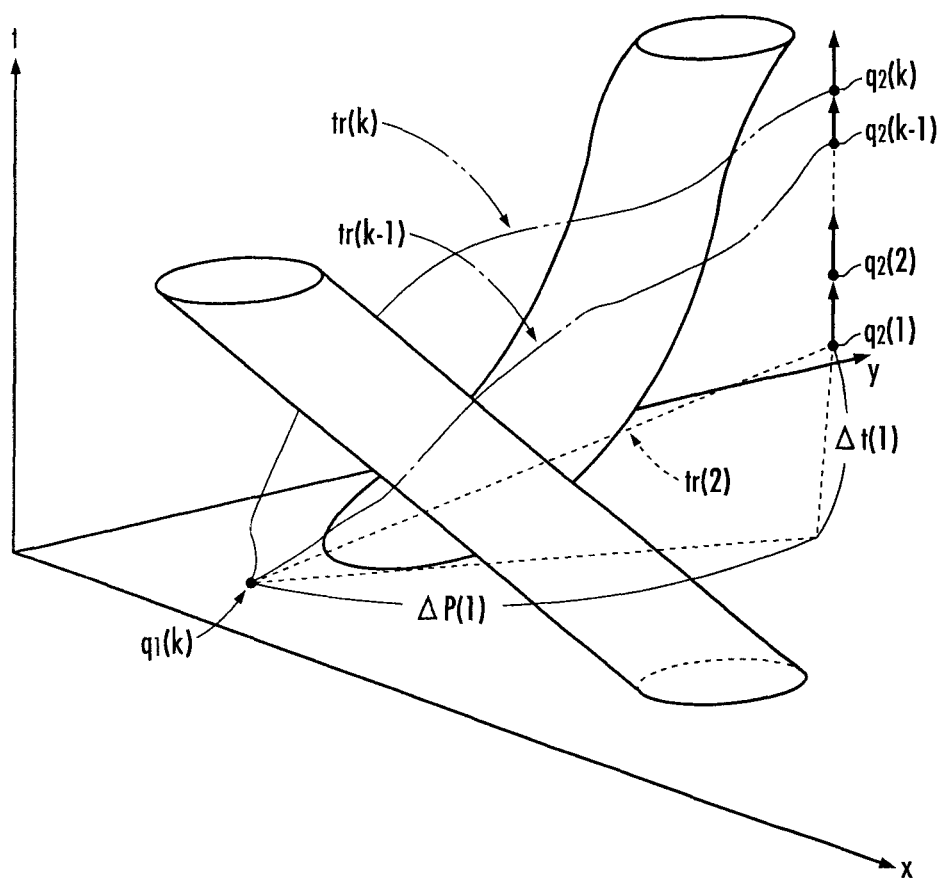
FIG. 4 is a diagram related to the setting of a positional relationship between a first reference point and a second reference point in a time-space coordinate system.

Thereafter, a positional relationship between the first reference point $q_1(k)$ and the second reference point $q_2(k)$ in the time-space coordinate system is set by the first arithmetic processing element 11 (FIG. 3/STEP 002). As illustrated in FIG. 4, for example, the time-space coordinate system may be a 3D space coordinate system defined by a 2D real space coordinate system $p=(x, y)$ and a time coordinate system $t$ (1D). However, it is acceptable that the real space coordinate system is 3D.

In the embodiment to be discussed herein, the positional relationship between the first reference point $q_1(k)$ and the second reference point $q_2(k)$ is adjusted by adjusting only the second timing $t_2(k)$ which is a component of the second reference point $q_2(k)=(p_2(k), t_2(k))$. Specifically, in the present embodiment, the first spatial position $p_1(k)$ and the first timing $t_1(k)$ which are components of the first reference point $q_1(k)=(p_1(k), t_1(k))$, and the second spatial position $p_2(k)$ which is a component of the second reference point $q_2(k)$ are maintained constant. The constantly maintained components may be input to the control system 1 from the outside via a remote controller or the like or may be measured on the basis of output signals from the internal state sensor $S_1$ or the like.

A current position, a predicted departure position, a predicted transit position or the like of the robot R in the real space is recognized as the first spatial position $p_1(k)$. The current position of the robot R may be measured on the basis of GPS signals received from a satellite by a receiver mounted in the robot R and if necessary output signals output from an acceleration sensor or the like constituting the internal state sensor $S_1$. A current timing, a predicted departure timing, a predicted transit timing or the like is recognized as the first timing $t_1(k)$. The current timing may be measured by a timer constituting the control system 1 of the robot R.

The initial positional relationship (k=1) between the first reference point $q_1(k)$ and the second reference point $q_2(k)$ is set to satisfy a first condition. The first condition is a condition that a velocity of the robot R is confined to an allowable range $[V_{min}, V_{max}]$ defined from the viewpoint of securing, the posture stability of the robot R and the like, in addition to the motion performance of the actuator 2. The first condition is expressed by the relational expression (001) on the basis of a space interval (linear distance) $des(p_2(k)-p_1(k))$ between the first spatial position $p_1(k)$ and the second spatial position $p_2(k)$, and a time interval $(t_2(k)-t_1(k))$ between the first timing $t_1(k)$ and the second timing $t_2(k)$.

$$V_{min} \leq des(p_2(k)-p_1(k))/(t_2(k)-t_1(k)) \leq V_{max} \qquad (001)$$

If the index k is omitted for the constantly maintained components, then the relational expression (001) in the present embodiment is expressed by the following relational expression (010).

$$V_{min} \leq des(p_2-p_1)/(t_2(k)-t_1) \leq V_{max} \qquad (010)$$

Thereby, as illustrated in FIG. 4, a timing posterior to the first timing $t_1$ in the time sequence by a time interval $\Delta t(k) = des(p_2(k)-p_1(k))/V_{max}$ only is set as the second timing $t_2$ (k=1).

Subsequently, a trajectory candidate tr(k) joining the first reference point $q_1(k)$ and the second reference point $q_2(k)$ having the positional relationship therebetween set in the time-space coordinate system is searched (FIG. 3/STEP 003). As illustrated by a dashed line in FIG. 4, when k=1, the linear line segment joining the first reference point $q_1(k)$ and the second reference point $q_2(k)$ in the time-space coordinate system is searched as a previous trajectory candidate tr(k) (k=1).

Thereafter, whether or not the previous trajectory candidate tr(k) has a contact with an object trajectory tro representing the time-series positions of an object such as a human being in the time-space coordinate system is determined (FIG. 3/STEP 004).

When making the determination, a spatial expansion of the robot R serving as the controlled subject and a spatial expansion of the object are taken into consideration. For example, the robot R is represented by a robot region having a predefined expansion in the real space, and in similar, the object is represented by an object region having a predefined expansion in the real space.

In order to reduce the arithmetic processing load, it is acceptable that the spatial expansion for the robot R is treated as a point region spatially reduced from the robot region and the spatial expansion for the object is treated as a Minkowski's sum resulted from the object region being enlarged to the extent that the robot region is reduced (refer to Japanese Patent Laid-open No. 2008-149436). Thereby, as illustrated in FIG. 4, the trajectory candidate tr(k) of the robot R is recognized as a line segment joining two different points. On the other hand, the object trajectory tro is recognized as a column-shaped body which has a cross section representing the spatial expansion of the object (more accurately, the object and the robot) in the real space and extends in the time direction.

The spatial expansion of the robot R is preliminarily stored in the memory constituting the control system 1. In addition, it is acceptable to calculate the spatial expansion of the robot R sequentially by taking into consideration the posture of the robot R such as the expansion of the arm B2 with reference to the main body B0 or the like. The posture of the robot R may be calculated according to a kinematics model on the basis of kinematics parameters such as the joint angle and the like expressed by the output signals from the sensors constituting the internal state sensor $S_1$.

The spatial expansion of the object may be recognized according to an analysis process on a captured image by the head camera C1 or the like constituting the external state sensor $S_2$. The time-series position of the object (the central position of the spatial expansion of the object) may be predicted according to the current velocity of the object. The velocity of the object is obtained by converting a displacement amount of the object in each captured image at different times from the image coordinate system to the real-space coordinate system. If the object is another robot or another mobile apparatus having communication function in addition to autonomous mobile function, it is acceptable to recognize a predicted time-series position by the control system 1 according to communications with the object.

If the previous trajectory candidate tr(k) is determined by the second arithmetic processing element 12 to have a contact with the object trajectory tro (FIG. 3/STEP 004 . . . NO), the index k is increased by 1 only (FIG. 3/STEP 006). Then, whether or not the index k is beyond an upper limit N is determined (FIG. 3/STEP 007).

If the index k is determined to be beyond the upper limit N (FIG. 3/STEP 007 . . . YES), the desired trajectory will not be set. In this case, a control process is performed to maintain the robot R in the stopped state or to stop the robot R.

On the other hand, the index k is determined to be equal to or smaller than the upper limit N (FIG. 3/STEP 007 . . . NO), a current positional relationship between the first reference point $q_1(k)$ and the second reference point $q_2(k)$ in the time-space coordinate system is set by the first arithmetic processing element 11 (FIG. 3/STEP 002).

The current positional relationship (k>1) between the first reference point $q_1(k)$ and the second reference point $q_2(k)$ is set to satisfy a second condition. The second condition is a condition that the current time interval $\Delta t(k) = t_2(k) - t_1$ becomes longer than the previous time interval $\Delta t(t-1) = t_2(k-1) - t1$. Thereby, as illustrated by the arrows in FIG. 4, the current second reference point $q_2(k)$ is shifted to the future side than the previous second reference point $q_2(k-1)$ in the time sequence.

Subsequently, a trajectory candidate tr(k) (k>1) joining the first reference point $q_1(k)$ and the second reference point $q_2(k)$ having the current positional relationship therebetween set in the time-space coordinate system is searched (FIG. 3/STEP 003). The searching method of the trajectory candidate tr(k) (k>1) will be described in detail hereinafter.

Thereafter, similar to that mentioned above, the processes after the determination of contact between the current trajectory candidate tr(k) and the object trajectory tro are repeated (refer to FIG. 3/STEP 004 and thereafter). If the current trajectory candidate tr(k) is determined to have no contact with the object trajectory tro (FIG. 3/STEP 003 . . . NO), the current trajectory candidate is set as the desired trajectory (FIG. 3/STEP 005), and the motion of the actuator 2 is controlled so that the robot R move along the desired trajectory.

Searching Method of a Trajectory Candidate

First Embodiment

As a first embodiment of the searching process of the trajectory candidate performed by the first arithmetic processing element 11, RRT-Connect is employed (refer to Knuffer et al. "An Efficient Approach to Single-Query Path Planning", In Proc. 2000 IEEE Int'l Conf. on Robotics and Automation (ICRA 2000)).

Figure 5:
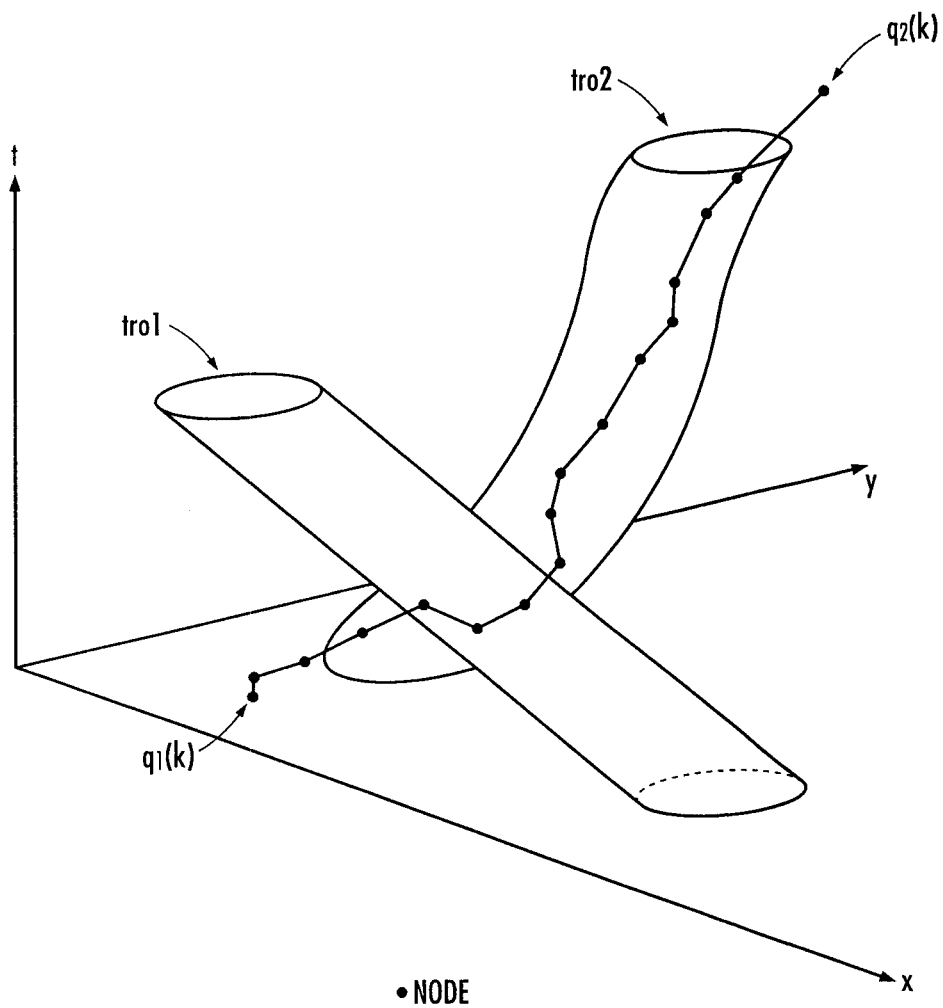
FIG. 5 is a diagram related to a searching result of a trajectory candidate in a first embodiment of the present invention.

In the present embodiment, an extending process is performed to extend a first line segment from the first reference point $q_1(k)$ and extend a second line segment from the second reference point $q_2(k)$ on the basis of the sequence of points (nodes) lined up in the time-space coordinate system. Thereafter, a line segment obtained by performing a joining process to join the first line segment and the second line segment is searched as the trajectory candidate tr(k). Consequently, as illustrated in FIG. 5, a line segment of a shape in which a plurality of nodes (sequence of points) present between the first reference point $q_1(k)$ and the second reference point $q_2(k)$ in the time-space coordinate system are joined is searched as the trajectory candidate tr(k).

It is acceptable to define a curved line segment which is obtained by performing a smoothing treatment on the trajectory candidate tr(k) to round the turnoffs as the final trajectory candidate tr(k).

Searching Method of a Trajectory Candidate

Second Embodiment

Figure 6:
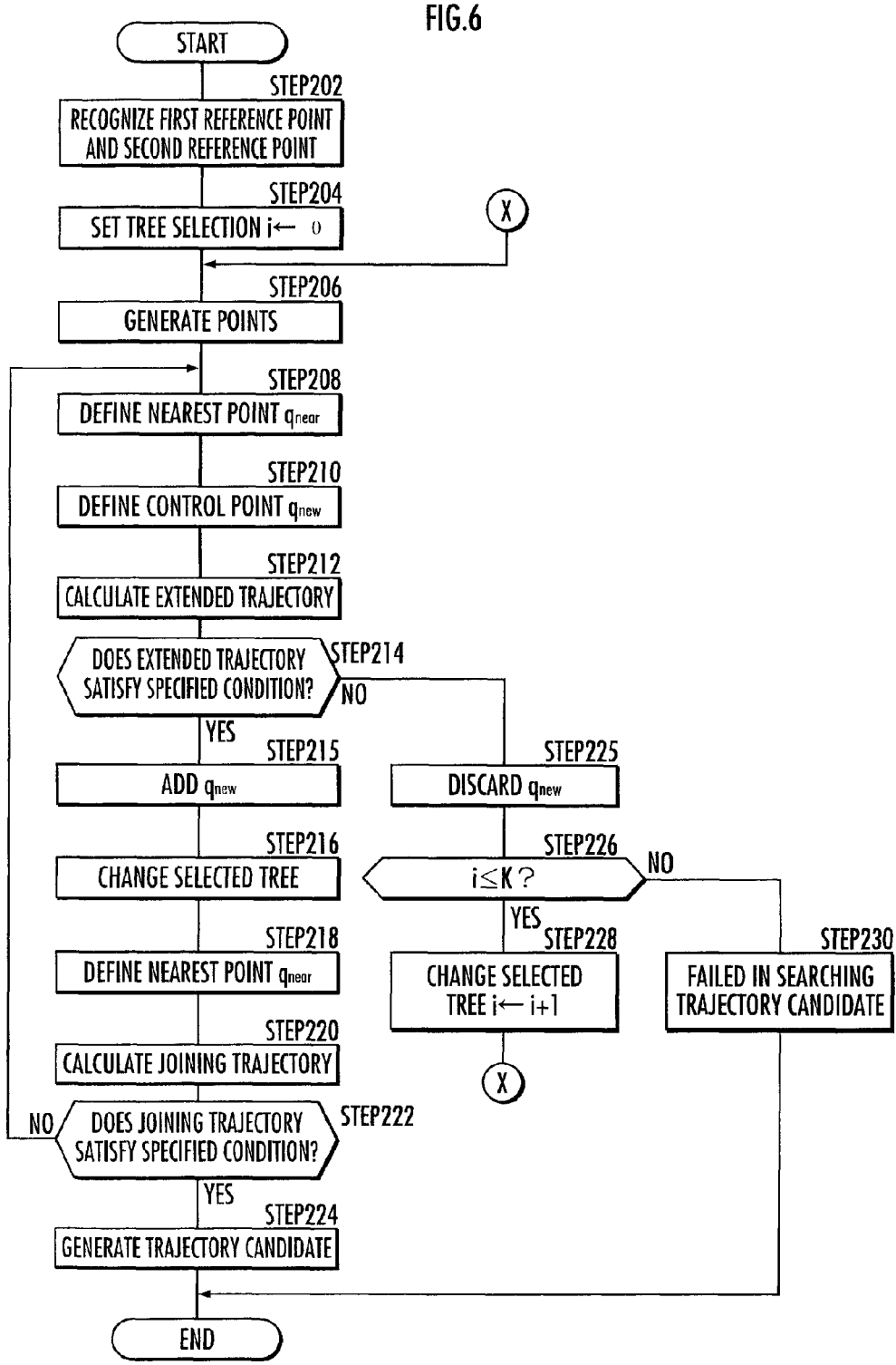
FIG. 6 is a flow chart illustrating a searching process of a trajectory candidate in a second embodiment of the present invention.

Firstly, as mentioned above, the position of the first reference point $q_1(k)$ and the position of the second reference point $q_2(k)$ in the time-space coordinate system are recognized (FIG. 6/STEP 202).

Thereafter, either a tree to the side of the first reference point or a tree to the side of the second reference point is selected (FIG. 6/STEP 204). Herein, an index i representing the alteration times of the tree selection accompanying the failure in generating an extended trajectory for the trajectory candidate to be described hereinafter is initially set to 0.

Subsequently, a point (node) q is generated at an arbitrary position according to the RRT algorithm (FIG. 6/STEP 206). At the initial phase, the tree to the side of the first reference point is the first reference point $q_1(k)$ itself; thereafter, the tree to the side of the first reference point gradually grows as the points q sequentially generated according to the RRT algorithm in a way of expanding from the first reference point $q_1(k)$ are sequentially joined together (refer to the dashed lines in FIG. 7(b)). Similarly, at the initial phase, the tree to the side of the second reference point is the second reference point $q_2(k)$ itself; thereafter, the tree to the side of the second reference point gradually grows as the points q sequentially generated according to the RRT algorithm in a way of expanding from the second reference point $q_2(k)$ are sequentially joined together (refer to the dashed lines in FIG. 7(b)). The extending process is performed with the selected tree as a subject.

In the extending process, firstly, a nearest point $q_{near}$ to the point q is selected from the selected tree (FIG. 6/STEP 208).

If the point q is deviated from the nearest point $q_{near}$ more than a threshold $\epsilon$, the point q is made to approach the nearest point $q_{near}$ to the distance of the threshold $\epsilon$ by the linear interpolation, and the approached point q is defined as a current control point $q_{new}$ (FIG. 6/STEP 210).

To the sequence of points from the base point of the selected tree to the nearest point $q_{near}$ which serves as the basis of a past B-spline curve, the current control point $q_{new}$ is added to the end of the sequence of points to yield a new sequence of points; and the interpolation process by the use of B-spline curve is performed on the basis of the new sequence of points. In the B-spline curve extending from the base point of the selected tree, the extended part yielded by adding the current control point $q_{new}$ to the former sequence of points is generated as the extended trajectory (FIG. 6/STEP 212).

The B-spline curve x(t) is represented as a linear combination of the sequence of control points $P_i$ (representing the positions of points, i=1, 2, . . . m) having a normalized B-spline basis function $B_{i,n}(t)$, as illustrated by the relational expression (011), as a combination coefficient. The extended trajectory is obtained by setting the range of the parameter t in the curve at $[t_{n-N-2}, t_{n-N-1}]$. N is a decode (log scale). n refers to a knot number. m refers to the number of control points.

$$x(t)=\Sigma_{i=1-m}B_{i,N}(t)P_i \quad (011)$$

The normalized B-spline basis function $B_{i,N}(t)$ is defined according to the following Cox-deBoor recursion formula (012).

$B_{i,1}(t)=1$(when $t_i<t<t_{i+1}$),0(the other situations), $$B_{i,k}(t)=\{(t-t_i)/(t_{i+k-1}-t_i)\}B_{i,k-1}(t)+\{(t_{i+k}-t)/(t_{i+k}-t_{i+1})\}B_{i+1,k-1}(t) \quad (012)$$

Thereby, as illustrated in FIG. 7(a) for example, the extended trajectory continuing after the previous trajectory which is defined on the basis of the selected tree (the tree to the side of the first reference point) is defined.

Subsequently, a first determination process is performed (FIG. 6/STEP 214). Specifically, it is determined whether or not the extended trajectory satisfies a specified condition, namely the extended trajectory is deviated from the object trajectory representing the time-series positions of an object such as a human being in the real space and the extended trajectory is not a trajectory forcing the robot R to act beyond allowable ranges of the joint angles thereof. As aforementioned, the existing behavior of the object trajectory in the time-space coordinate system may be recognized on the basis of the output signals from the external state sensor $S_2$.

If it is determined that the extended trajectory satisfies the specified condition (FIG. 6/STEP 214 . . . YES), in other words, the extending process is successful, the control point $q_{new}$ or the extended trajectory up to the current control point $q_{new}$ is added to the selected tree (FIG. 6/STEP 215). In addition, the previous trajectory and the extended trajectory are defined as the current trajectory, and the current trajectory is treated as the previous trajectory in the next extending process. After the extending process, the joining process is performed.

In the joining process, firstly, the selected tree is changed (FIG. 6/STEP 216). Therefore, if the tree to the side of the first reference point has been the selected tree until now, the tree to the side of the second reference point is selected as a new selected tree for subsequent processing. On the other hand, if the tree to the side of the second reference point has been the selected tree until now, the tree to the side of the first reference point is selected as a new selected tree for subsequent processing.

The nearest point $q_{near}$ to the current control point $q_{new}$ (refer to FIG. 6/STEP 210) generated previously is selected from the selected tree (FIG. 6/STEP 218).

To the sequence of points from the base point of the tree to the side of the first reference point to the nearest point $q_{near}$ which serves as the basis of the current trajectory to the side of the first reference point until now and the sequence of points from the initial point of the tree to the side of the second reference point to the nearest point $q_{near}$ which serves as the basis of the current trajectory to the side of the second reference point until now, a current control point $q_{new}$ is added in between the sequence of points to yield a new sequence of points; and the interpolation process by the use of B-spline curve is performed on the basis of the new sequence of points. In the B-spline curve joining the first reference point and the second reference point, a part yielded by adding the current control point $q_{new}$ to the former sequence of points is generated as the joining trajectory (FIG. 6/STEP 220).

If the node number of the current control point $q_{new}$ is defined as "i", the joining trajectory is obtained by setting the range of the parameter t in the curve at $[t_{i+1}, t_{i+N+1}]$. Thereby, as illustrated in FIG. 7(b), the joining trajectory (solid line) joining the trajectory to the side of the first reference point (chain line) extending from the first reference point and the trajectory to the side of the second reference point (two-dot chain line) extending from the second reference point is generated.

Thereafter, whether or not the joining trajectory satisfies the specified condition is determined (FIG. 6/STEP 222).

Figure 8:
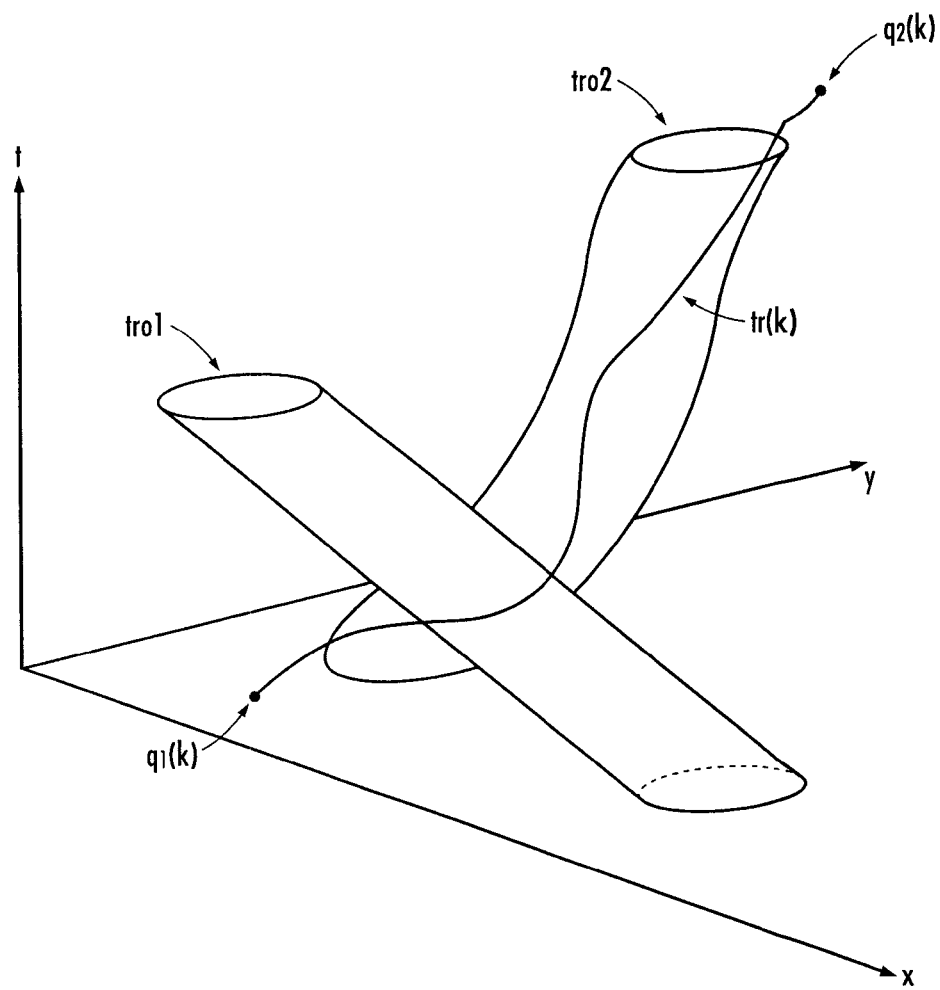
FIG. 8 is a diagram related to a searching result of a trajectory candidate in the second embodiment of the present invention.

If it is determined that the joining trajectory satisfies the specified condition (FIG. 6/STEP 222 . . . YES), in other words, the joining process is successful, the joining trajectory itself and the trajectory to the side of the first reference point and the trajectory to the side of the second reference point joined by the joining trajectory is generated or searched as the trajectory candidate tr(k) of the robot R from the first reference point $q_1(k)$ to the second reference point $q_2(k)$ (FIG. 6/STEP 224). FIG. 8 illustrates as an example a trajectory candidate tr(k) from the first reference point $q_1(k)$ to the second reference point $q_2(k)$ generated according to the method of the present invention for the robot R to avoid obstacles.

Figure 9:
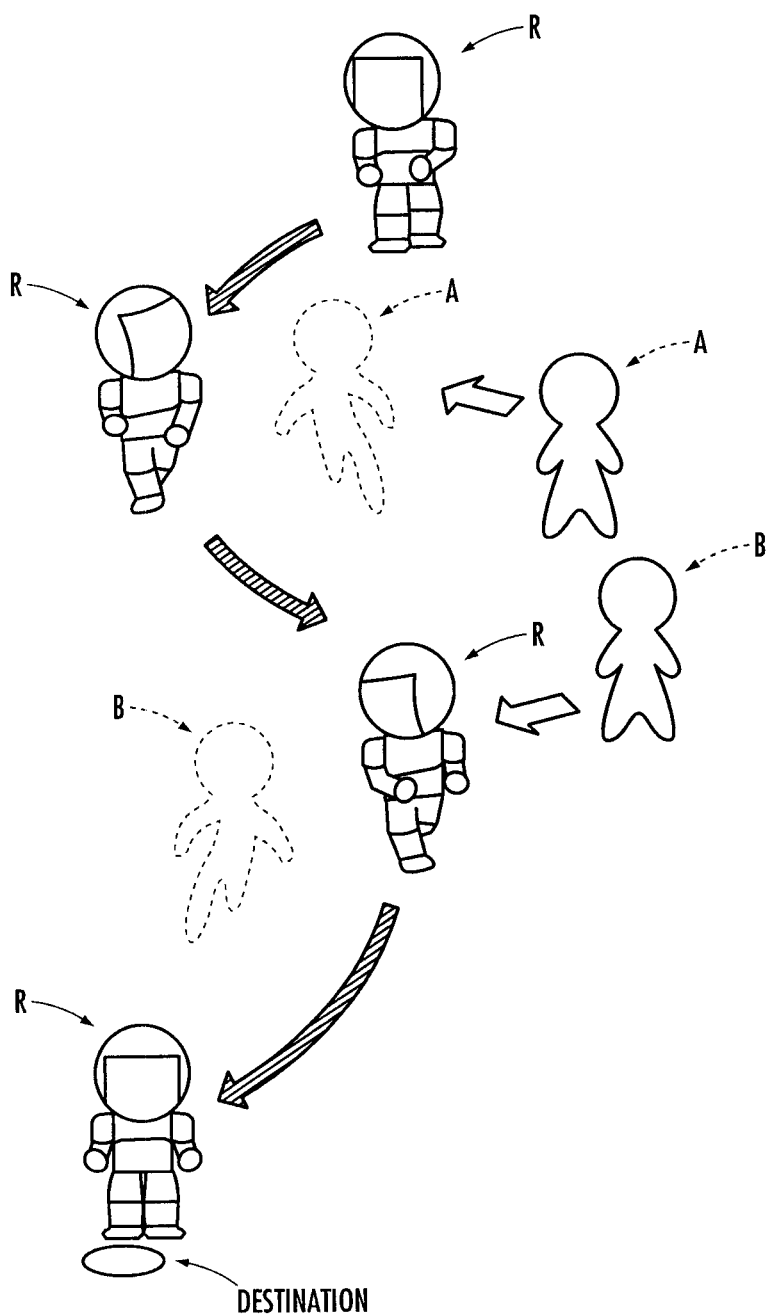
FIG. 9 is a diagram illustrating a behavior of a robot.

Thereby, as illustrated in FIG. 9, the motions of the actuator 2 are controlled to perform a task in which the robot R moves the right and left legs B4 to walk through moving humans (objects) to the destination.

On the other hand, if it is determined that the joining trajectory does not satisfy the specified condition (FIG. 6/STEP 222 . . . NO), in other words, the joining process is failed, the extending process is performed once more (refer to FIG. 6/STEP 208 to STEP 214).

If it is determined that the extended trajectory does not satisfy the specified condition (FIG. 6/STEP 214 . . . NO), in other words, the extending process is failed, the current control point $q_{new}$ or the extended trajectory to the control point $q_{new}$ is discarded without being added to the selected tree (FIG. 6/STEP 225). Subsequently, whether or not the index i is equal to or smaller than an upper limit K is determined (FIG. 6/STEP 226).

If it is determined that the index i is equal to or smaller than the upper limit K (FIG. 6/STEP 226 . . . YES), the selected tree selection is changed (FIG. 6/STEP 226). The index i is increased by "1" only. Thereafter, the subsequent processes after the generation of an arbitrary point q are performed with the selected tree after the change.

If it is determined that the index i is greater than the upper limit K (FIG. 6/STEP 226 . . . NO), it is recognized that the search of the trajectory candidate has failed (FIG. 6/STEP 230). Accordingly, the control system 1 changes the starting conditions for performing a new task by controlling the motions of the robot R such as to stop the robot R moving along the trajectory and standing by for the situations to change such as the moving away of an object (recognized through the external state sensor $S_2$), to move the robot R away from its current position by operating the legs B4 thereof, or to make the robot R twist the main body B0 at its current position. Thereafter, the control system 1 performs again the search of the trajectory candidate as mentioned above.

Point Elimination Process

The point elimination process is performed by the first arithmetic processing element 11 to exclude an inappropriate point from the sequence of points serving as the basis of generating a trajectory candidate in the trajectory searching process (refer to FIG. 3/STEP 003).

Specifically, a point positioned in the past of the time sequence with respect to a preceding point is eliminated from the sequence of points proceeding to the first reference point $q_1(k)$ which is used in the searching process of the trajectory candidate tr(k). Moreover, a point positioned in the future of the time sequence with respect to the preceding point is eliminated from the sequence of points proceeding to the second reference point $q_2(k)$ which is used in the searching process of the trajectory candidate tr(k). According thereto, an irrealizable trajectory candidate tr(k) tracking back to the past of the time sequence in the time-space coordinate system can be prevented from being searched.

Further, a point beyond an allowable range defined in accordance with the motion performance of the actuator 2 with respect to the preceding point is eliminated from the sequence of points which is used in the searching process of the trajectory candidate tr(k). According thereto, the robot R is prevented from being forced to displace at a velocity beyond the allowable range defined according to the motion performance of the actuator.

Effects of the Control System of the Present Invention

According to the control system 1 and the robot R having the mentioned functions, the trajectory candidate tr(k) having no contact with the object trajectory tro in the time-space coordinate system is generated as the desired trajectory. By controlling the motions of the actuator 2 according to the desired trajectory, it is possible to displace the controlled subject, namely the robot R while avoiding contact with the other objects in the real space.

The relative positional relationship between the first reference point $q_1(k)$ and the second reference point $q_2(k)$ of the trajectory candidate in the time-space coordinate system determines a velocity of the controlled subject when the controlled subject moves from a first spatial position $p_1(k)$ to a second spatial position $p_2(k)$. Specifically, the longer the time interval between the first reference point $q_1(k)$ which is anterior in the time sequence and the second reference point $q_2(k)$ which is posterior in the time sequence in the time-space coordinate system is, in other words, the longer the time required for the controlled subject to displace from the first spatial position $p_1(k)$ to the second spatial position $p_2(k)$ in the real space is, the lower the velocity of the controlled subject will be. The shorter the space interval between the first reference point $q_1(k)$ and the second reference point $q_2(k)$ in the time-space coordinate system is, in other words, the shorter the real space distance for the controlled subject to move from the first spatial position $p_1(k)$ to the second spatial position $p_2(k)$ is, the lower the velocity of the controlled subject will be.

Therefore, the initial positional relationship (k=1) between the first reference point $q_1(k)$ and the second reference point $q_2(k)$ in the time-space coordinate system is set to satisfy the first condition, and the first condition is defined according to the motion performance of the actuator 2.

According thereto, the desired velocity for displacing the robot R (the controlled subject) from the first spatial position $p_1(k)$ to the second spatial position $p_2(k)$ can be prevented from becoming an inappropriate value deviated out of the allowable range of displacement velocity of the controlled subject which is defined according to the motion performance of the actuator 2.

Further, if the previous trajectory candidate tr(k−1) is determined to have a contact with the object trajectory tro, the current positional relationship (k>1) between the first reference point $q_1(k)$ and the second reference point $q_2(k)$ in the time-space coordinate system is set to satisfy the second condition. The second condition is a condition that the current time interval between the first reference point $q_1(k)$ and the second reference point $q_2(k)$ is longer than the previous time interval.

According thereto, each time when the researching of a trajectory candidate $tr(k)$ is repeated, the trajectory candidate is searched in which the velocity for displacing the controlled subject from the first spatial position $p_1(k)$ to the second spatial position $p_2(k)$ in the real space is gradually reduced. Thereby, the desired velocity of the controlled subject can be prevented from being given an inappropriate value beyond the upper limit of the allowable range of displacement velocity of the controlled subject which is defined according to the motion performance of the actuator 2.

Thereby, the desired trajectory for the controlled subject in the time-space coordinate system can be searched in an appropriately manner in view of the state of the controlled subject such as the motion performance of the actuator 2 or the like (refer to FIG. 9).

Figure 7:
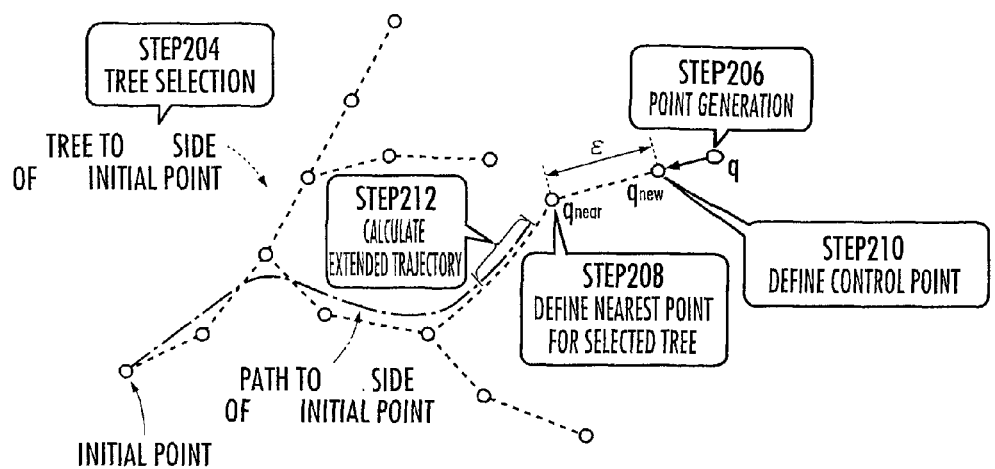
FIG. 7(A) and FIG. 7(B) are diagrams illustrating an extending process and a joining process in the second embodiment of the present invention.
Figure 7:
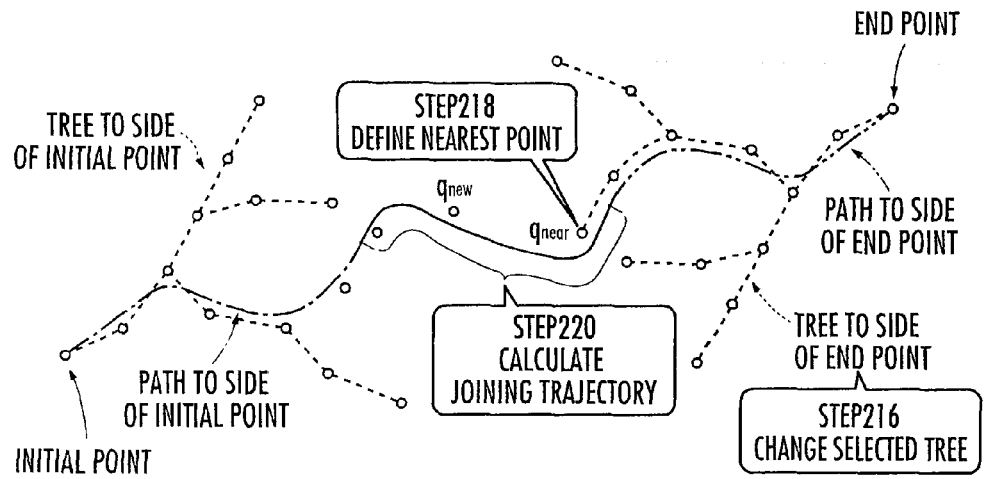

Particularly, according to the searching method of a trajectory candidate of the second embodiment, the desired trajectory or a trajectory candidate thereof is generated by performing an interpolation process to generate line segments represented by a linear combination of the sequence of points in the time-space coordinate system, and the linear combination of the sequence of points has a basis function for space interpolation serving as a combination coefficient (refer to the relational expression (11), FIG. 7(*a*) and FIG. 7(*b*)). Therefore, it is not a polygonal line passing through each of the plural points lined up in the time-space coordinate system (refer to FIG. 5) but a continuous or smooth line segment joining the first reference point $q_1(k)$ and the second reference point $q_2(k)$ which is represented by the linear combination of the plural points (control point) is generated as the desired trajectory or a trajectory candidate thereof for the controlled subject (refer to FIG. 7(*b*) and FIG. 8). Thereby, continuousness or smoothness of the displacement behavior of the controlled subject along the desired trajectory may be maintained.

Another Embodiment of the Present Invention

It is acceptable to use the searching method mentioned above to search a desired trajectory when the robot R (controlled subject) is moving along a general path and is about to generate an alternative path for avoiding contact with an object such as a human being or the like in the midway thereof.

Figure 10:
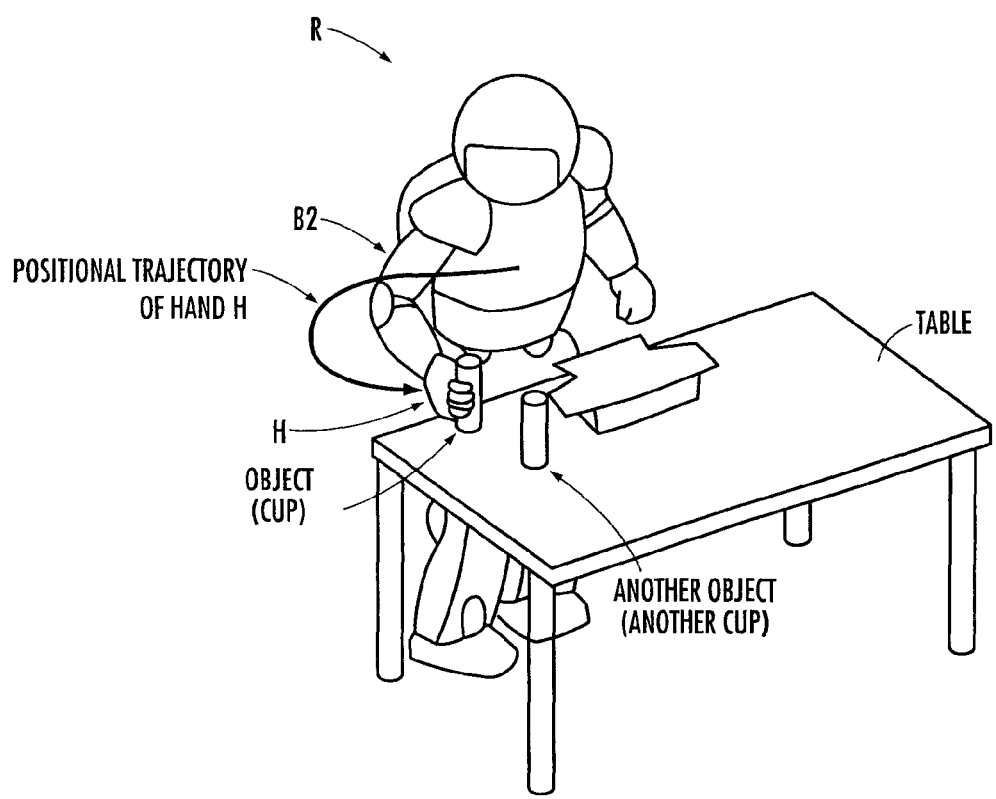
FIG. 10 is a diagram illustrating another behavior of the robot.

As illustrated in FIG. 10, it is acceptable to use the searching method mentioned above to search a desired trajectory for the robot R when the robot R is performing a task of moving a cup held in the hand H by moving the arm B2 and putting it on the table without making the hand H and the cup contact the other cup on the table.

Here, the first reference point $q_1(k)$ corresponds to the position of one hand H when the robot R is holding the cup with the hand H in the real space, and the second reference point $q_2(k)$ corresponds to, for example, the position of the hand H when the robot R puts the cup on the table in the real space.

The first reference point $q_1(k)$ and the second reference point $q_2(k)$ may be calculated by the control system 1 on the basis of the output signals from the internal state sensor $S_1$ and the external state sensor $S_2$, respectively, or may be input to the control system 1 from an external terminal device via wireless communication.

The motions of the robot R are controlled to move the hand H in the real space as illustrated by the arrow curve. Thereby, it is possible for the robot R to perform smoothly the task of putting the cup held in the hand H on the table while avoiding contact with the other object and preventing each joint angle from going beyond the corresponding allowable range.

According to the above embodiment, the positional relationship between the first reference point $q_1(k)=(p_1(k), t_1(k))$ and the second reference point $q_2(k)=(p_2(k), t_2(k))$ in the time-space coordinate system is adjusted by fixing the first spatial position $p_1(k)$, the first timing $t_2(k)$ and the second spatial position $p_2(k)$ and varying the second timing $t_2(k)$. It is acceptable to adjust the positional relationship according to various examples including the present example (example 1) listed in Table 1.

TABLE 1

| Example | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| first spatial position $p_1$ | - | - | - | - | - | - | o | - | o | o | o | - | o | o | o |
| first timing $t_1$ | - | - | o | - | - | o | - | o | - | o | o | - | o | - | o |
| second spatial position $p_2$ | - | o | - | - | o | - | - | o | o | - | o | o | - | o | o |
| second timing $t_2$ | o | - | - | - | o | o | o | - | - | - | o | o | o | - | o | o: variable;
-: fixed

For example, if the first spatial position $p_1(k)$ is an invariable position such as the current position or an essential position for performing a task or the like of a controlled subject such as the robot R or the like, and the first timing $t_1(k)$ is invariable such as the current timing or the like, the positional relationship between the first reference point $q_1(k)$ and the second reference point $q_2(k)$ may be adjusted according to examples 1, 2 or 5 listed in Table 1.

On the opposite, if the second spatial position $p_2(k)$ and the second timing $t_2(k)$ are invariable, the positional relationship between the first reference point $q_1(k)$ and the second reference point $q_2(k)$ may be adjusted according to examples 3, 4 or 10 listed in Table 1.

It is acceptable for the first arithmetic processing element 11 to be configured to perform the searching process of a trajectory candidate $tr(k)$ as described below.

Specifically, it is acceptable that a plurality of second reference points $q_2(k; m_2)$ ($m_2=1$ to $M_2$) are defined with respect to a single first reference point $q_1(k)$ in the time-space coordinate system, and a line segment joining the singular first reference point $q_1(k)$ and a singular second reference point $q_2(k; j_2)$ among the plurality of the second reference points $q_2(k; m_2)$ which is obtained at the earliest time according to the extending process and the joining process is searched as the trajectory candidate $tr(k)$.

As a substitute, it is acceptable that a plurality of first reference points $q_1(k; m_1)$ ($m_1=1$ to $M_1$) are defined with respect to a single second reference point $q_2(k)$ in the time-space coordinate system, and a line segment joining a singular first reference point $q_1(k; j_1)$ among the plurality of the first reference points $q_1(k; m_1)$ and the singular second reference point $q_2(k)$ which is obtained at the earliest time according to the extending process and the joining process may be searched as the trajectory candidate tr(k).

According to the control system 1 having the mentioned configuration, a motion instruction signal can be transmitted to the actuator 2 as soon as possible according to the search result of the desired trajectory. Therefore, when the displacement behavior of the controlled is controlled at real time in parallel to the searching of the desired trajectory, it is possible to prevent the controlled subject from becoming temporally frozen or completely stopped in operation.

It is acceptable that a plurality of second reference points $q_2(k; m_2)$ ($m_2=1$ to $M_2$) are defined with respect to a singular first reference point $q_1(k)$ in the time-space coordinate system, a plurality of line segments are obtained by joining the singular first reference point $q_1(k)$ to the plurality of the second reference points $q_2(k; m_2)$ respectively according to the extending process and the joining process, a singular line segment is selected in accordance with the time interval between the first reference point $q_1(k)$ and the second reference point $q_2(k; m_2)$ therefrom, and the selected line segment is searched as the trajectory candidate tr(k).

As a substitute, it is acceptable that a plurality of first reference points $q_1(k; m_1)$ ($m_1=1$ to $M_1$) are defined with respect to a singular second reference point $q_2(k)$, a plurality of line segments are obtained by joining the singular second reference point $q_2(k)$ to the plurality of the first reference points $q_1(k; m_1)$ respectively according to the extending process and the joining process, a singular line segment is selected in accordance with the time interval between the first reference point $q_1(k; m_1)$ and the second reference point $q_2(k)$ therefrom, and the selected line segment is searched as the trajectory candidate tr(k).

According to the control system 1 having the mentioned configuration, the length of time required for the controlled subject to displace from the first spatial position $p_1(k)$ to the second spatial position $p_2(k)$ along the desired trajectory may be adjusted. For example, by setting a trajectory candidate tr(k) in which the required time is the shortest, it is possible to displace the controlled subject as soon as possible.

It is acceptable that the first arithmetic processing element 11 is configured to set the initial positional relationship (k=1) between the first reference point $q_1(k)$ and the second reference point $q_2(k)$ by adjusting the length of at least one of the initial time interval $(t_2(k)-t_1(k))$ and the initial space interval $des(p_2(k)-p_1(k))$ between the first reference point $q_1(k)=(p_1(k), t_1(k))$ and the second reference point $q_2(k)=(p_2(k), t(k))$ in the time-space coordinate system.

The length of time interval $(t_2(k)-t_1(k))$ may be adjusted by varying at least one of the first timing $t_1(k)$ and the second timing $t_2(k)$ (refer to Table 1, the embodiments 1 and 3, the embodiments 5 to 8 and 10 to 15). The length of initial space interval $des(p_2(k)-p_1(k))$ may be adjusted by varying at least one of the first spatial position and the second spatial position (refer to Table 1, examples 2, 4, 5, and 7 to 15).

The level of contact probability between the controlled subject and the object may be evaluated according to the numbers of objects recognized by the control system 1 in the surroundings of the controlled subject, the length of space interval between the controlled subject and the object, or whether or not an extended line segment of the velocity vector of the controlled subject crosses with an extended line segment of the velocity vector of the object, and the like.

It is acceptable that the first arithmetic processing element 11 is configured to set the current positional relationship (k>1) between the first reference point $q_1(k)$ and the second reference point $q_2(k)$ according to the level of contact probability between the controlled subject and the object by adjusting the length of at least either one of the current time interval $(t_2(k)-t_1(k))$ and the current space interval $des(p_2(k)-p_1(k))$ between the first reference point $q_1(k)=(p_1(k), t_1(k))$ and the second reference point $q_2(k)=(p_2(k), t_2(k))$ on the basis of at least either one of the previous time interval and the previous space interval, on condition that it is determined by the second arithmetic processing element 12 that the trajectory candidate tr(k−1) has a contact with the object trajectory tro (refer to FIG. 3/STEP 004 . . . NO).

For example, it is acceptable to set the current positional relationship between the first reference point $q_1(k)$ and the second reference point $q_2(k)$ in such a way that an increment of the current time interval $(t_2(k)-t_1(k))$ with respect to the previous time interval $(t_2(k-1)-t_1(k-1))$ increases as the contact probability becomes higher. It is also acceptable to set the current positional relationship between the first reference point $q_1(k)$ and the second reference point $q_2(k)$ in such a way that an increment or a decrement of the current space interval $des(p_2(k)-p_1(k))$ with respect to the previous space interval $des(p_2(k-1)-p_1(k-1))$ increases as the contact probability becomes higher.

According to the control system 1 having the above configuration, the positional relationship between the first reference point $q_1(k)$ and the second reference point $q_2(k)$ can be set or corrected appropriately so as to search a trajectory candidate tr(k) promptly to reduce the contract probability between the controlled subject and the object.

In the searching process for a trajectory candidate according to the second embodiment, it is acceptable that the first determination process and the second determination process are omitted, whether or not a trajectory candidate generated after the completion of the joining process satisfies the specified condition is determined, and the trajectory candidate is set as the desired trajectory on condition that the determination result is affirmative.

In addition to the B-spline curve (refer to the relational expression (011)), it is acceptable to perform the extending process and the joining process respectively by using the Hermite curve defined by the relational expression (021) or the Bezier curve defined by the relational expression (031) as the space interpolation curve.

$$P(t)=(2t^3-3t^2+1)P_{start}+(t^3-2t^2+t)G1_{start}+(-2t^3+3t^2)P_{end}+(t^3-t^2)G1_{end} \quad (021)$$

Wherein, $P_{start}$ and $P_{end}$ represent a positional vector at the end points of the curve, respectively; $G1_{start}$ and $G1_{end}$ represent a tangent vector (first-order differential) of the curve at the end points of the curve, respectively. In the extending process and the joining process, the Hermite curve is applied to RRT-Connect by interpolating each section of the sequence of control points P, (i=1, 2 . . . m) with the Hermite curve. Herein, $G1_{start}$ and $G1_{end}$ must be selected as adjacent sections so as to keep the first-order differential continuous.

$$x(t)=\Sigma_{i=0-m}J_{n,i}(t)P_i \quad (031)$$

Herein, the Bezier basis function (or Bernstein basis function) $J_{n,i}(t)$ is defined by the relational expression (032).

$$J_{n,i}(t)=n!/\{i!(n-i)!\}t^i(1-t)^{n-i} \quad (032)$$

Fundamentally, it is essential that the space interpolation used in the extending process and the joining process should satisfy two conditions: a first supplementary condition that the space interpolation generates line segments represented by a linear combination of a sequence of points in the time-space coordinate system in which a basis function for space interpolation serves as a combination coefficient, and a second supplementary condition that a partial curve generated from the current control points remains the same when a new control point is added to the current control sequence of points.

However, although the Bezier curve does not satisfy the second condition, similar to the Hermite curve, it may be adopted as the space interpolation curve by splitting the sequence of points in path into plural sections and joining the plural Bezier curves.

What is claimed is:

1. A control system configured to control motions of an actuator so as to make time-series positions of a controlled subject in real space follow a desired trajectory in a time-space coordinate system defined by a real-space coordinate system and a time coordinate system, comprising:
   a first arithmetic processing element configured to:
   set an initial positional relationship between a first reference point and a second reference point in the time-space coordinate system to satisfy a first condition defined according to a motion performance of the actuator;
   perform an extending process to extend a first line segment from the first reference point and extend a second line segment from the second reference point on the basis of a sequence of points in the time-space coordinate system; and
   perform a joining process to join the first line segment and the second line segment to search a line segment as a trajectory candidate; and
   a second arithmetic processing element configured to determine whether the trajectory candidate has a contact with an object trajectory representing time-series positions of an object discrete from the controlled subject in the time-space coordinate system;
   the first arithmetic processing element is configured to set a current positional relationship between the first reference point and the second reference point to satisfy a second condition, on a condition that a previous trajectory candidate is determined to have a contact with the object trajectory by the second arithmetic processing element, the second condition including that a current space interval between the first reference point and the second reference point in the time-space coordinate system is shorter than a previous space interval, or a current time interval between the first reference point and the second reference point in the time-space coordinate system is longer than a previous time interval, or the current space interval between the first reference point and the second reference point in the time-space coordinate system is shorter than the previous space interval and the current time interval between the first reference point and the second reference point in the time-space coordinate system is longer than the previous time interval, and search a current trajectory candidate, and
   the first arithmetic processing element is configured to set the previous trajectory candidate as the desired trajectory, on a condition that the previous trajectory candidate is determined to have no contact with the object trajectory by the second arithmetic processing element,
   wherein the first arithmetic processing element is configured to set the initial positional relationship between the first reference point and the second reference point through adjusting the length of at least one of the initial time interval and the initial space interval between the first reference point and the second reference point in the time-space coordinate system according to a level of a contact probability between the controlled subject and the object.

2. The control system according to claim 1, wherein the first arithmetic processing element is configured to eliminate a point positioned in the past of the time sequence with respect to a preceding point from the sequence of points proceeding to the first reference point used in searching the trajectory candidate and a point positioned in the future of the time sequence with respect to a preceding point from the sequence of points proceeding to the second reference point used in searching the trajectory candidate.

3. The control system according to claim 2, wherein the first arithmetic processing element is configured to eliminate a point beyond an allowable range defined in accordance with the motion performance of the actuator with respect to the preceding point from the sequence of points used in searching the trajectory candidate.

4. The control system according to claim 1, wherein the first arithmetic processing element is configured to
   define a plurality of second reference points with respect to a singular first reference point or a plurality of first reference points with respect to a singular second reference point in the time-space coordinate system, and
   search a line segment joining the singular first reference point to a singular second reference point among the plurality of the second reference points or a line segment joining a singular first reference point among the plurality of the first reference points and the singular second reference point which is obtained fastest by performing the extending process and the joining process, as the trajectory candidate.

5. The control system according to claim 1, wherein the first arithmetic processing element is configured to
   define a plurality of second reference points with respect to a singular first reference point or a plurality of first reference points with respect to a singular second reference point in the time-space coordinate system,
   select a singular line segment from a plurality of line segments obtained by joining the singular first reference point to the plurality of the second reference points respectively or a line segment from a plurality of line segments obtained by joining the plurality of the first reference points and the singular second reference point, by performing the extending process and the joining process, in accordance with the time interval between the first reference point and the second reference point, and
   search the selected line segment as the trajectory candidate.

6. The control system according to claim 1, wherein the first arithmetic processing element is configured to set the current positional relationship between the first reference point and the second reference point by adjusting the length of at least one of the current time interval and the current space interval between the first reference point and the second reference point in the time-space coordinate system, taking at least one of the previous time interval and the previous space interval as a reference, according to the level of the contact probability between the controlled subject and the object, on a condition that a previous trajectory candidate is determined to have a contact with the object trajectory by the second arithmetic processing element.

7. The control system according to claim 1, wherein the first arithmetic processing element is configured to perform an interpolation process to generate line segments represented by a linear combination of the sequence of points, in which a basis function for space interpolation serves as a combination coefficient, according to the mutually discrete points lined up in the time-space coordinate system, add new points to the sequence of points which is the base of one line segment generated by the interpolation process to define a new sequence of points and perform the interpolation process with the new sequence of points as the base, so as to perform the extending process to generate a new line segment in which the one line segment is extended by an extended line segment, and perform the interpolation process on the new sequence of points which is the base of the one line segment recently extended according to the extending process and another sequence of points which is the base of another line segment generated by the interpolation process, so as to perform the joining process which generates a line segment with a form of the one line segment and the another line segment being joined by a joining line segment.

8. The control system according to claim 7, wherein the second arithmetic processing element is configured to perform a second determination process which determines whether or not a specified condition including that the joining line segment deviates from the object trajectory in the time-space coordinate system is satisfied, and the first arithmetic processing element is configured to redefine a new sequence of points and perform the extending process on condition that the determination result of the second determination process is negative.

9. The control system according to claim 7, wherein the second arithmetic processing element is configured to perform a first determination process which determines whether or not a specified condition including that the extended line segment deviates from the object trajectory in the time-space coordinate system is satisfied, and the first arithmetic processing element is configured to discard the one line segment and perform the extending process on condition that the determination result of the first determination process is that the specified condition is not satisfied.

10. A robot comprising a base body, a limb extended from the base body, an actuator and a control system, wherein the limb serves as a controlled subject to the control system, the control system is configured to control motions of the actuator so as to displace the limb to make the robot follow a desired trajectory in real space and is provided with a first arithmetic processing element configured to:

set an initial positional relationship between a first reference point and a second reference point in the time-space coordinate system to satisfy a first condition defined according to a motion performance of the actuator;

perform an extending process to extend a first line segment from the first reference point and extend a second line segment from the second reference point on the basis of a sequence of points in the time-space coordinate system; and perform a joining process to join the first line segment and the second line segment to search the line segment as a trajectory candidate; and a second arithmetic processing element configured to determine whether the trajectory candidate has a contact with an object trajectory representing time-series positions of an object discrete from the controlled subject in the time-space coordinate system;

the first arithmetic processing element is configured to set a current positional relationship between the first reference point and the second reference point to satisfy a second condition, on a condition that a previous trajectory candidate is determined to have a contact with the object trajectory by the second arithmetic processing element, the second condition including that a current space interval between the first reference point and the second reference point in the time-space coordinate system is shorter than a previous space interval, or a current time interval between the first reference point and the second reference point in the time-space coordinate system is longer than a previous time interval, or the current space interval between the first reference point and the second reference point in the time-space coordinate system is shorter than the previous space interval and the current time interval between the first reference point and the second reference point in the time-space coordinate system is longer than the previous time interval, and search a current trajectory candidate, and the first arithmetic processing element is configured to set the previous trajectory candidate as the desired trajectory, on a condition that the previous trajectory candidate is determined to have no contact with the object trajectory by the second arithmetic processing element, wherein the first arithmetic processing element is configured to set the initial positional relationship between the first reference point and the second reference point through adjusting the length of at least one of the initial time interval and the initial space interval between the first reference point and the second reference point in the time-space coordinate system according to a level of a contact probability between the controlled subject and the object.

11. A mobile apparatus comprising an actuator and a control system, wherein the mobile apparatus serves as a controlled subject to the control system, the control system is configured to control motions of the actuator so as to make the mobile apparatus follow a desired trajectory in real space and is provided with a first arithmetic processing element configured to:

set an initial positional relationship between a first reference point and a second reference point in the time-space coordinate system to satisfy a first condition defined according to a motion performance of the actuator;

perform an extending process to extend a first line segment from the first reference point and extend a second line segment from the second reference point on the basis of a sequence of points in the time-space coordinate system; and perform a joining process to join the first line segment and the second line segment to search the line segment as a trajectory candidate; and a second arithmetic processing element configured to determine whether the trajectory candidate has a contact with an object trajectory representing time-series positions of an object discrete from the controlled subject in the time-space coordinate system;

the first arithmetic processing element is configured to set a current positional relationship between the first reference point and the second reference point to satisfy a second condition, on a condition that a previous trajectory candidate is determined to have a contact with the object trajectory by the second arithmetic processing element, the second condition including that a current space interval between the first reference point and the second reference point in the time-space coordinate system is shorter than a previous space interval, or a current time interval between the first reference point and the second reference point in the time-space coordinate system is longer than a previous time interval, or the current space interval between the first reference point and the second reference point in the time-space coordinate system is shorter than the previous space interval and the current time interval between the first reference point and the second reference point in the time-space coordinate system is longer than the previous time interval, and search a current trajectory candidate, and the first arithmetic processing element is configured to set the previous trajectory candidate as the desired trajectory, on a condition that the previous trajectory candidate is determined to have no contact with the object trajectory by the second arithmetic processing element, wherein the first arithmetic processing element is configured to set the initial positional relationship between the first reference point and the second reference point through adjusting the length of at least one of the initial time interval and the initial space interval between the first reference point and the second reference point in the time-space coordinate system according to a level of a contact probability between the controlled subject and the object.

* * * * *